Polczynski

[11] 4,089,584
[45] May 16, 1978

[54] MULTIPLE STATION MULTIPLEXED COMMUNICATIONS LINK EMPLOYING A SINGLE OPTICAL FIBER

[75] Inventor: Christopher E. Polczynski, Rancho Palos Verdes, Calif.

[73] Assignee: Northrop Corporation, Los Angeles, Calif.

[21] Appl. No.: 737,178

[22] Filed: Oct. 29, 1976

[51] Int. Cl.² ............... G02B 5/14; H04B 9/00
[52] U.S. Cl. ............... 350/96.16; 350/96.19; 250/199
[58] Field of Search ........... 350/96 C, 96 WG, 96 R; 250/199; 179/15 AL

[56] References Cited

U.S. PATENT DOCUMENTS

| | | | |
|---|---|---|---|
| 3,643,030 | 2/1972 | Sparrendahl | 179/15 AL |
| 3,874,779 | 4/1975 | Thiel | 350/96 C |
| 3,986,020 | 10/1976 | Kogelnik | 250/199 |

OTHER PUBLICATIONS

A. F. Milton, "Optical Fiber Applications", AGARD Lecture Series No. 76 on Electro-Optical Systems, London, England, May 1975, pp. 8-1-21.

*Primary Examiner*—John K. Corbin
*Assistant Examiner*—Rolf Hille
*Attorney, Agent, or Firm*—Edward A. Sokolski

[57] ABSTRACT

A single optical fiber having a core with at least one planar side is arranged in an open loop configuration to form a bus which is run between a plurality of communications stations to be served. The legs of the loop are placed side by side to form a paired line cable which interconnects the stations. At each station, a transmit line is coupled into one of the cable lines, and a receive line coupled into the other, such coupling being achieved without breaking the fiber core, by means of a coupler such as a prism, taper, grating coupler or the like, which abuts against an exposed planar portion of the fiber core. Electrical signals are modulated onto a light beam generated at each station by means of a photo-emitter, the light signals received at each station being demodulated from the light beam and processed for utilization as may be required. A multiplex control is employed to time multiplex the signals transmitted from the various stations.

10 Claims, 4 Drawing Figures

MULTIPLE STATION MULTIPLEXED COMMUNICATIONS LINK EMPLOYING A SINGLE OPTICAL FIBER

This invention relates to optical communications links, and more particularly to such a link employing a single optical fiber having a core with at least one planar side.

Fiber optics have exhibited marked advantages for use in communications links as compared with wired systems. This is in view of the inherent immunity of fiber optics to all types of electromagnetic interference and the capacity for a light wave to carry a much wider band of information than electrical signals transmitted on wires. Thus, a single fiber needs no radiation shielding and is capable of carrying more information than a multi-wired cable which has a substantially greater diameter and weight. The use of fiber optics therefore provides the possibility of a data and communications link of substantially less bulk, weight and cost than wired systems. This is particularly attractive for uses in vehicles such as aircraft and ships, as well as in fixed installations requiring complicated communications and data linkages.

Fiber optical communications systems of the prior art utilize cylindrical fiber bundles to carry optical signals, and butt splicing for access at each station. However, such systems have several disadvantages stemming from the cylindrical geometry of the fibers, the use of fiber bundles, and butt coupling techniques. Specifically, the breaks in the fiber bundles required by butt splicing, combined with the built-in packing fraction loss (unavoidable loss due to the optically dead area between individual fibers in a fiber bundle), result in unnecessary optical loss. Further, it is inefficient to couple light from a rectangular emitting area of semiconductor laser into the end of a round fiber. Also, it is difficult to achieve single mode coupling, and to tap small amounts of optical signals at any point on the fiber for monitoring. Furthermore, it is a characteristic of a cylindrical fiber that the polarization of light propagating in it is undefined. Thus, the use of such a fiber presents a serious problem in many active switching applications. A particularly significant disadvantage of prior art optical communication systems, however, is that no practical "T" couplers have been developed or proposed. Previous and proposed systems utilizing "T" couplers, because of high optical losses inherent in the "T" design for cylindrical fiber bundles, have been limited to multiplexing only a few stations, and thus are inefficient and unacceptable for most applications.

One approach that has been utilized to couple a plurality of stations to an optical data link is a star coupled optical data multiplexing system containing an optical mixing "star". In this arrangement, optical signals coming through the fiber bundles from all terminals are mixed in a "star" coupler and then reflected back to all terminals. This approach, while avoiding some of the coupling problems mentioned above in connection with "T" couplers, presents limitations as to the addition of additional stations to a pre-existing system in view of the fact that there must be an output provided from the "star" in the originally designed system for each terminal in the system.

The system of the present invention overcomes the aforementioned shortcomings of prior art fiber optical links in several ways. Firstly, a fiber with a core having at least one planar side is utilized which enables the efficient coupling of light energy from a planar source by means of a coupler which abuts against a planar surface of the core and does not require a breaking or splicing thereof. Further, the non-cylindrical core configuration of the fiber enables the preservation of the polarization of the light input and facilitates single mode coupling. The system of the present invention also makes for a simple and efficient coupling of an input and output at each station by utilizing an open loop bus in the configuration of a "hairpin", which is formed into a cable which runs between the stations such that at each station there is a line forming part of the bus carrying signals in one direction, and a line forming another part of the bus carrying signals in an opposite direction, one of these lines being used for receiving inputs from the stations, the other of these lines being used for feeding outputs to the stations.

It is therefore an object of this invention to improve the efficiency of fiber optical communications links.

It is a further object of this invention to facilitate the preservation of light polarization in a fiber optical data link.

It is a further object of this invention to facilitate the coupling of light signals to and from a fiber optical communications link.

It is still another object of this invention to facilitate single mode coupling to an optical bus.

It is still a further object of this invention to provide an optical communications link wherein stations can be coupled to the link at any point therealong without breaking the core of the fiber optical bus.

Other objects of this invention will become apparent as the description proceeds in connection with the accompanying drawings, of which:

Briefly described, the system of my invention is as follows: A fiber optical bus having a core with at least one planar side (such as is afforded with a rectangular cross section) is arranged in the form of an open loop or "hairpin" with the legs of the loop placed side by side and integrated into a paired line cable which runs between a plurality of stations comprising a communications network. A pair of lines thus runs by each station, one of these lines forming a portion of the bus which carries optical signals in a first direction, the other of these lines forming a portion of the bus which carries optical signals in a direction opposite to this first direction. Optical couplers are utilized at each station to couple a light signal from the station to one of the lines, and to couple a light signal from the other of the lines to the station. Such couplers, which may be of the prism, taper, grating type, etc., are such that they are capable of efficiently coupling light energy to or from their associated lines without breaking these lines, i.e., by merely abutting the couplers against an exposed portion of a planar surface of the core of the fiber. A time multiplexing control is utilized to successively effect transmission from each of the stations on a time shared basis. Appropriate filters are utilized at each station to filter out information addressed to that station for utilization as may be required.

Figure 1:
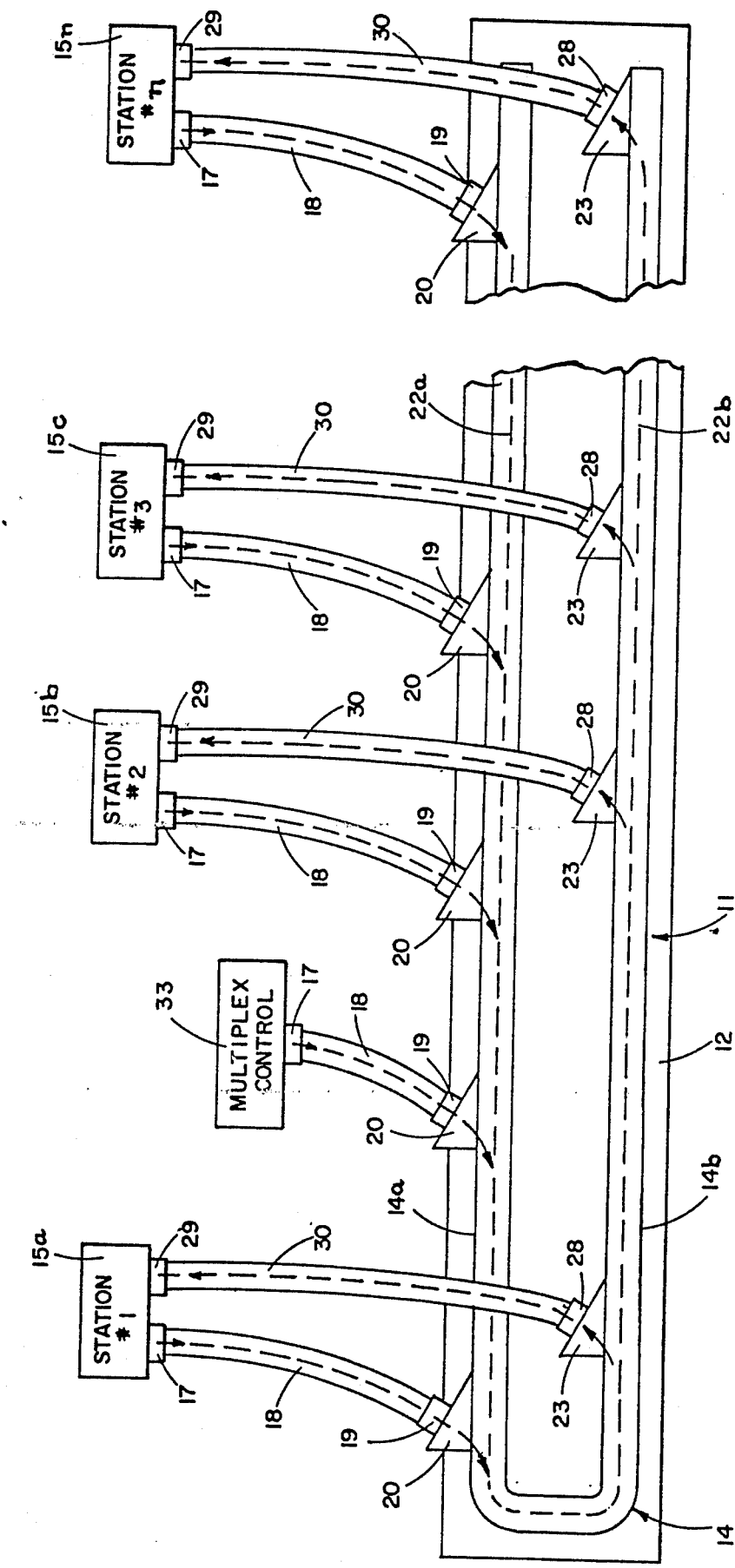
FIG. 1 is a schematic drawing illustrating the basic features of my system.

Referring now to FIG. 1, the basic features of the system of the invention are illustrated. Cable 11 runs between a plurality of stations 15a–15n, which form a communications network. Cable 11 comprises a cladding 12 surrounding a core 14 having at least one planar side, this cable being arranged in an open loop or "hairpin" configuration. Core 14 includes first line portion 14a which is used to carry light signals in a first direction as indicated by dotted lines 22a, and a second line portion 14b which is used to carry light signals in a direction opposite to the first direction as indicated by dotted lines 22b, portions 14a and 14b both running by each of the stations. Light signals are coupled from each station to input couplers 20 by means of fiber optical lines 18 and end couplers 17 and 19. Couplers 20, which are shown as being of the prism type for exemplary purposes, are used to couple the light signals received from lines 18 to fiber optic core portion 14a. Couplers 20 are abutted against exposed surface portions of fiber optic core portion 14a, these surfaces being cleared by removing appropriate portions of cladding thereon (as to be explained in connection with FIG. 3). Other types of couplers which may be utilized include taper couplers and grating couplers.

Various such couplers are described in the November 1971 issue of APPLIED OPTICS, Volume 10, Pages 2395–2413, in an article entitled *Light Waves in Thin Films and Integrated Optics*, by P. K. Tien. It is to be noted that while the author, Tien, was only concerned with using such couplers for coupling to thin film structures, in the present invention they are used for coupling to optical fibers. The end couplers 17 and 19 may be connectors commercially available from Valtec Corporation, West Boylston, Massachusetts.

Line couplers 23 are utilized to receive signals from core portion 14b and are placed in abutment against an exposed planar portion of this core in a manner such as to extract light from the core. Line couplers 23 are coupled to stations 15a–15n respectively, by means of end couplers 28 and 29 and fiber optic lines 30 which are similar to couplers 17 and 19 and lines 18. The transmission of signals from stations 15a–15n is time shared on core 14. This end result is implemented by multiplex control 33 which transmits a control signal to core portion 14a through end couplers 17 and 19, fiber optical line 18 and line coupler 20. The multiplexing signal placed on core portion 14a is received by each of the stations from core portion 14b and used to control the transmission from each station in an appropriate predetermined time sequence.

Figure 2:
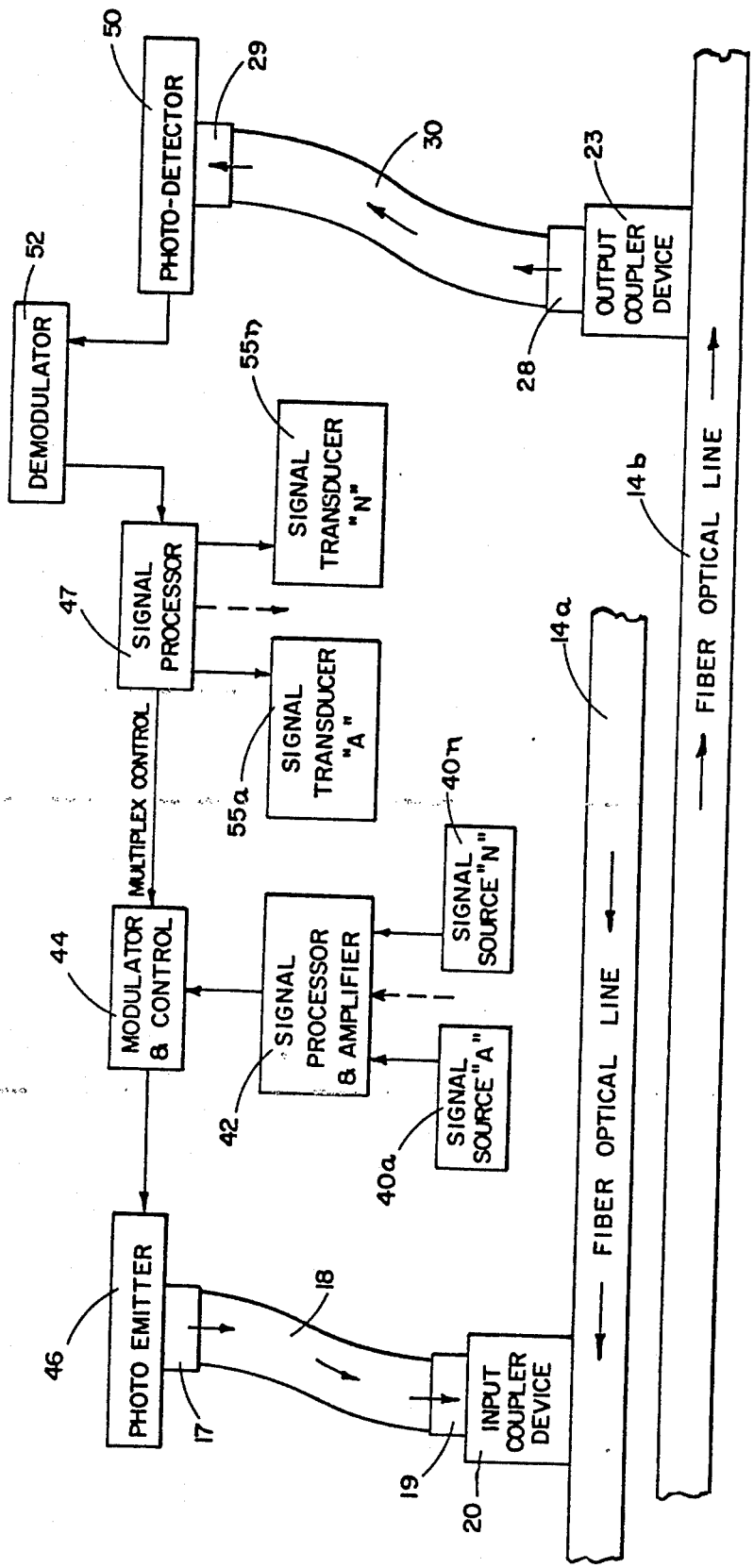
FIG. 2 is a functional schematic drawing illustrating an embodiment of one of the stations of my system.

Referring now to FIG. 2, one of the stations of the system of the invention is schematically illustrated. Electrical signals are generated by various signal sources 40a–40n, located at each station. Signal sources 40a–40n may comprise microphones, teletypes, television cameras, computer terminals, etc. The outputs of signal sources 40a–40n are fed to signal processor and amplifier 42 where they are appropriately multiplexed together (either time or frequency multiplexing) and amplified. The output of signal processor and amplifier 42 is fed to modulator and control 44. Modulator and control 44 is utilized to modulate the output of photoemitter 46 as well as to switch the operation of this photoemitter on and off in response to a multiplex control signal fed thereto from signal processor 47. Photoemitter 46 may, for example, comprise a diode injection laser, a light emitting diode or other such commercially available light emitter.

The output of photoemitter 46 is coupled to fiber optic line 18 by means of end coupler 17, this output being coupled from line 18 by means of end coupler 19 to input coupler device 20. Input coupler device 20, which as described in connection with FIG. 1 may comprise a conventional prism, taper, grating or other such coupler, is used to couple the light signals to fiber optical core 14a, the coupler being placed in abutment against an exposed surface of the core. Signals placed on fiber optical core 14b are coupled by means of output coupler device 23, end couplers 28 and 29, and fiber optical line 30 to photo detector 50. Output coupler device 23 may comprise a coupler similar to input coupler device 20 but arranged to couple signals off rather than onto the core.

Photo detector 50 may comprise a conventional light detector such as a photo diode/amplifier unit. Such devices are commercially available, a typical such commercially available device being the MHZ Series Photodiode Amplifiers available from Electro Optic Division of E G & G INC., Salem, Massachusetts. The output of photodetector 50 is fed to demodulator 52 which appropriately demodulates the electrical signals therefrom. The output of demodulator 52 is fed to signal processor 47 which appropriately processes these signals by means of various filters to select the signals addressed to the particular station and to separate these signals for the various signal transducers 55a–15n which transduce the signals to audio signals, teletype signals, television signals, etc., as the case may be. It is to be noted that the present invention is concerned with the communications and data link itself, rather than the processing equipment, and these end utilization processors and transducers may take various forms as application requirements may dictate.

Figure 3:
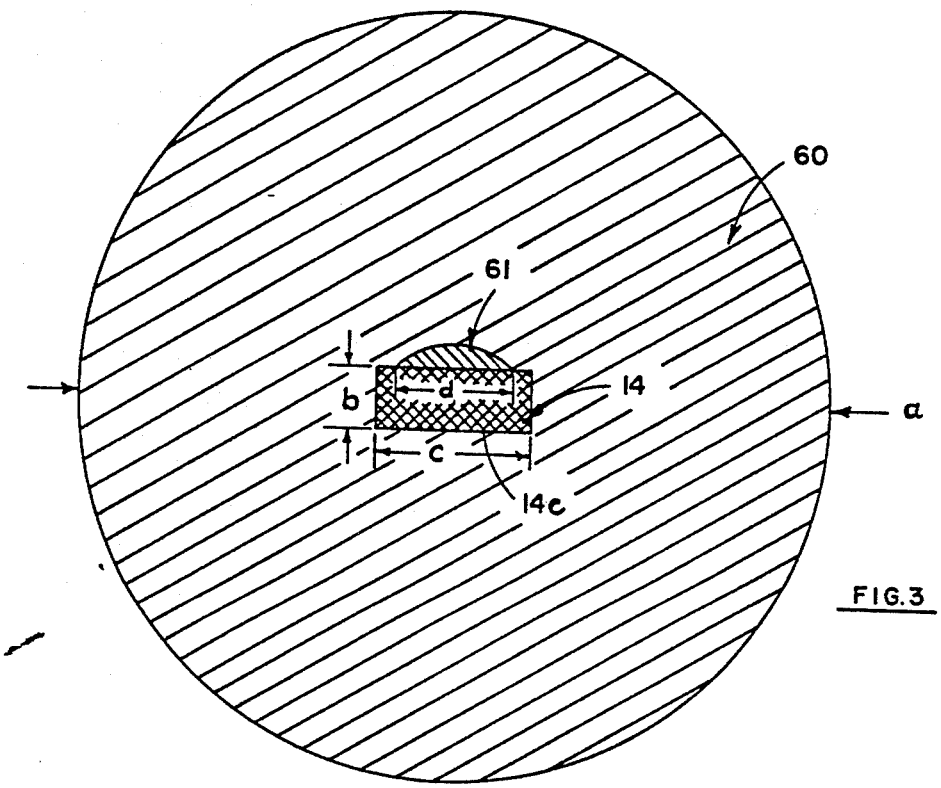
FIG. 3 is a perspective drawing illustrating one embodiment of the fiber optical bus utilized in my system.

Referring now to FIG. 3, one embodiment of the fiber optical line of the invention is illustrated. This particular embodiment shall be hereinafter referred to as the "optical stripline fiber" and is suitable for handling a single or multimode optical signal, depending on the dimension "b". The optical stripline fiber consists of a rectangular core 14, with a strip 61 which is here shown in the shape of a hump but may be of other shapes, located above the core. The core 14 and strip 61 are surrounded by a cylindrical cladding 60 which may be of other shapes. The core 14, strip 61, and cladding 60 are made of materials which have a low attenuation of light frequencies propagating in them. The core 14 and strip 61 may be made from the same material, and thus have the same index of refraction, while the cladding 60 should be made to have a lower index of refraction, or the optical stripline fiber may be made in such a way as to make the index of refraction of the core 14 highest, and the index of refraction of the strip 61 lower than that of the core 14, but higher than that of the cladding 60. The cladding 60 should be of a material that can be chemically or otherwise removed to provide easy access to the surface 14c of the core 14. The coupler will abut against this exposed surface in the region directly opposite the strip 61. It is a property of the stripline geometry that the light propagating in such a light waveguide will be confined to the portion of the core 14 which is located directly under the strip 61. This minimizes the dissipation of energy outside the side surfaces of the core. Typical dimensions for the parameters of the embodiment of FIG. 3 are as follows:

"a" = 250 μm
"b" = 2 μm for single mode
"b" = 50 μm for multi mode
"c" = 75 μm
"d" < "c"

Figure 4:
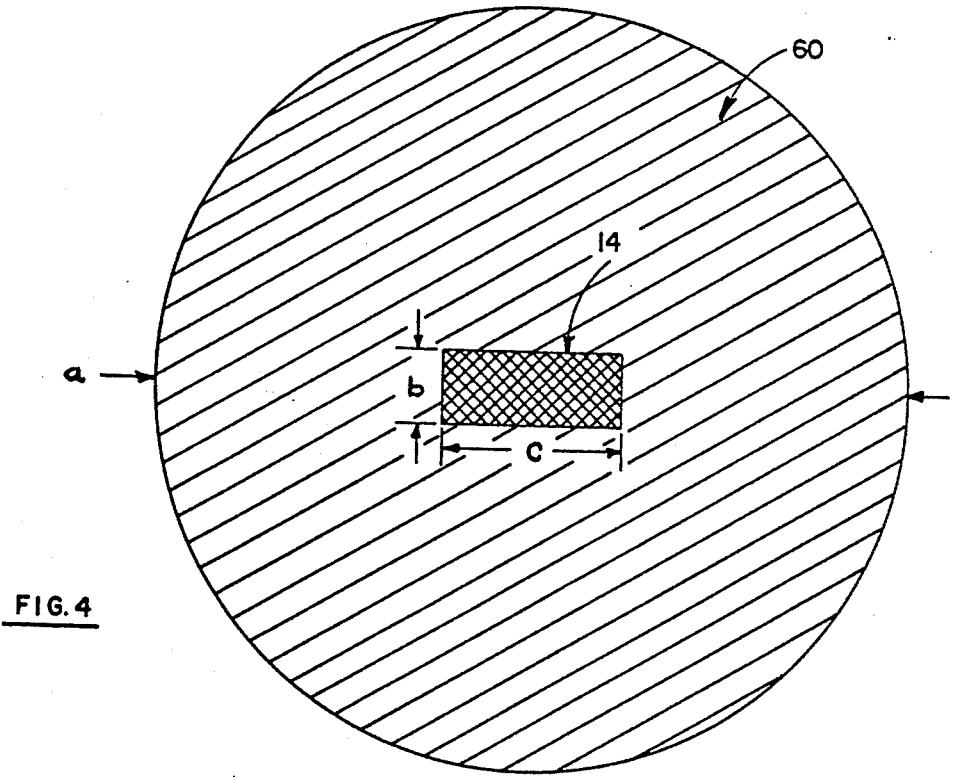
FIG. 4 is a perspective view illustrating another embodiment of the fiber optical bus utilized in my system.

Referring now to FIG. 4, a second embodiment of the fiber optical ribbon of the invention is shown. This embodiment is also suitable for handling single or multimode optical signals (the number of modes being determined by the dimension "a"). A rectangular core 14 is surrounded by a cladding 60. The index of refraction of the core 14 is higher than that of cladding 60, with both core 14 and cladding 60 made of materials having low attenuation for light frequencies which will propagate in the fiber. Cladding 60 should be made easily removable by chemical or other means for access to the surface of the core 14. The coupler will abut against the long dimension "c" of the rectangular core. Typical dimensions for the fiber optical structure of FIG. 4 are as follows:

"a" = 250 μm
"b" = 2 μm for single mode
"b" = 50 μm for multi mode
"c" = 75 μm

It is to be noted that in both the optical stripline fiber and in the rectangular optical fiber, light propagates only in the rectangular geometry core. Propagation in the rectangular geometry core has the decided advantage over cylindrical geometry core in that light propagates in this guide with a preferred polarization (i.e., electrical field parallel to the long dimension of the rectangular cross-section). This is important in considering switching characteristics.

Also it should be noted that it is much easier to splice the rectangular core cross-section optical fiber than cylindrical fiber insofar as alignment is concerned, in that alignment is only required in the long dimension of the rectangular cross-section (i.e., horizontally). On the other hand, cylindrical wave guides must be accurately aligned in two dimensions if high coupling losses in the system are to be avoided.

While the invention has been described and illustrated in detail, it is to be clearly understood that this is intended by way of illustration and example only and is not to be taken by way of limitation, the spirit and scope of this invention being limited only by the terms of the following claims.

I claim:

1. A communications link for multiplexing a plurality of stations comprising:
 a single optical fiber having a core cross-section having at least one planar side and arranged in an open loop configuration to form a pair of legs, the legs of said loop being placed side by side to form a paired line cable which runs between said stations,
 input coupler means at each station for coupling optical signals from said station onto one of the legs of said loop for transmission solely in a first direction,
 output coupler means at each station for coupling optical signals traveling only in a direction opposite to said first direction from the other of the legs of said loop to each of said stations,
 said input and output coupler means comprising optical coupling devices adapted to couple optical signals to and from said fiber without breaking or splicing said fiber core.

2. The communications link of claim 1 wherein said core has a rectangular cross section.

3. The communications link of claim 1 wherein said coupler means comprise couplers placed in abutment against an exposed planar surface portion of the fiber core.

4. The communications link of claim 3 wherein said coupler means comprise prism couplers.

5. The communications link of claim 1 and further including time multiplexing control means for effecting the transmission of optical signals from each of said stations to said one of the legs of said loop in succession.

6. A communications link for multiplexing a plurality of stations, each of said stations including means for generating an optical signal, means for modulating each of said optical signals with one or more electrical signals, means for detecting optical signals and means for demodulating electrical signals from said detected optical signals,
 a single optical fiber having a core with at least one planar side and arranged in an open loop configuration, said loop having a pair of legs, the legs of said loop being arranged side by side to form a paired line cable which runs between the stations,
 an optical coupler for coupling each of said optical signals from said generating means to one of the legs of said loop for transmission along said one of said legs solely in a first direction, and
 an optical coupler for coupling portions of optical signals travelling only in a direction opposite to said first direction from the other of the legs of said loop to said detecting means,
 said optical couplers having planar coupling surfaces which are placed in abutment against exposed planar surface portions of the core of said fiber.

7. The communications link of claim 6 wherein said couplers comprise prism couplers.

8. The communications link of claim 6 and further including time multiplexing control means for effecting the transmission of optical signals from each of said stations to said one of the legs of said loop in succession.

9. The communications link of claim 6 wherein said cable comprises an optical fiber core covered with a cladding having low light transmission characteristics, portions of said cladding being removed to provide the exposed surface portions of the fiber core against which the couplers are abutted.

10. The communications link of claim 6 wherein said core has a rectangular cross section.

* * * * *